United States Patent
Henderson et al.

(10) Patent No.: US 6,944,913 B2
(45) Date of Patent: Sep. 20, 2005

(54) HINGE ASSEMBLY FOR A FOLDING FABRIC TOP

(75) Inventors: Jack V. Henderson, West Bloomfield, MI (US); Joel Dawson, Taylor, MI (US); Ken Wardell, Monroe, MI (US); Charles Turney, Toledo, OH (US); Gregory A. Brower, Fenton, MI (US)

(73) Assignee: Decoma International Inc., Concord (CA)

( * ) Notice: Subject to any disclaimer, the term of this patent is extended or adjusted under 35 U.S.C. 154(b) by 29 days.

(21) Appl. No.: 10/469,193

(22) PCT Filed: Feb. 25, 2002

(86) PCT No.: PCT/CA02/00235

§ 371 (c)(1),
(2), (4) Date: Aug. 25, 2003

(87) PCT Pub. No.: WO02/066275

PCT Pub. Date: Aug. 29, 2002

(65) Prior Publication Data

US 2004/0216276 A1 Nov. 4, 2004

Related U.S. Application Data

(60) Provisional application No. 60/270,808, filed on Feb. 23, 2001.

(51) Int. Cl.⁷ .............................................. E05D 11/10
(52) U.S. Cl. .............................. 16/321; 16/324; 16/326; 16/352
(58) Field of Search ......................... 16/312, 319, 324, 16/326, 327, 332, 334–336, 374, 82, 50, 352; 5/93.2, 99.1, 98.1; 182/163, 165, 166, 177; 403/92, 93, 95–98, 102, 100; 280/655, 655.1; 49/248, 371; 296/100.06, 100.04, 100.07, 100.08, 100.09, 107.01, 107.04, 107.07, 107.09, 107.15, 223–225, 109, 107.16, 216.01, 218, 219, 220.01

(56) References Cited

U.S. PATENT DOCUMENTS

| | | | | | |
|---|---|---|---|---|---|
| 1,940,099 | A | * | 12/1933 | Preston | 16/297 |
| 2,709,275 | A | * | 5/1955 | Johnson | 16/332 |
| 3,858,744 | A | * | 1/1975 | Garvert | 217/60 G |
| 4,534,079 | A | * | 8/1985 | Tucker | 14/14 |
| 4,573,732 | A | * | 3/1986 | Muscat | 296/108 |
| 4,968,089 | A | | 11/1990 | Murai et al. | |
| 5,018,783 | A | | 5/1991 | Chamings et al. | |
| 5,080,428 | A | * | 1/1992 | Rouland | 296/218 |
| 5,353,451 | A | * | 10/1994 | Hsiung | 5/99.1 |
| 5,516,187 | A | | 5/1996 | Zani et al. | |

(Continued)

FOREIGN PATENT DOCUMENTS

| | | | | |
|---|---|---|---|---|
| DE | 3934557 C1 | * | 3/1991 | ........... B62D/25/12 |
| DE | 10208848 A1 | * | 9/2003 | ............. B60J/7/12 |
| GB | 316810 | | 9/1928 | |
| JP | 02151525 | | 11/1990 | |
| JP | 102871135 | | 10/1998 | |

*Primary Examiner*—Chuck Y. Mah
(74) *Attorney, Agent, or Firm*—Clark Hill PLC

(57) ABSTRACT

A hinge assembly for securing a folding fabric top of an automotive vehicle between an open and closed position includes a front pivot bracket pivotally connected to a rear pivot bracket for pivotal movement between the closed position wherein the brackets are aligned axially and the open position wherein the brackets are overlapping. A first locking tab extends from each of said front and rear pivot brackets for releasably interlocking and retaining the brackets in the axially aligned closed position. A second locking tab extends from each of the front and rear pivot brackets for releasably interlocking and retaining the brackets in the overlapping open position. The front and rear pivot brackets support respective front and rear support frames supporting and attaching a folding fabric top to the automotive vehicle for pivotal movement between the open and closed positions.

10 Claims, 4 Drawing Sheets

U.S. PATENT DOCUMENTS

| | | | |
|---|---|---|---|
| 5,685,046 A | * 11/1997 | Neag et al. | 16/366 |
| 5,715,573 A | * 2/1998 | Holemans | 16/287 |
| 5,781,944 A | * 7/1998 | Huang | 5/99.1 |
| 5,839,778 A | 11/1998 | Schaible et al. | |
| 5,897,160 A | 4/1999 | Reihl et al. | |
| 6,250,837 B1 | * 6/2001 | Mariol et al. | 403/102 |
| 6,253,417 B1 | * 7/2001 | Rusiana | 16/82 |
| 6,450,562 B1 | * 9/2002 | Miklosi et al. | 296/115 |

* cited by examiner

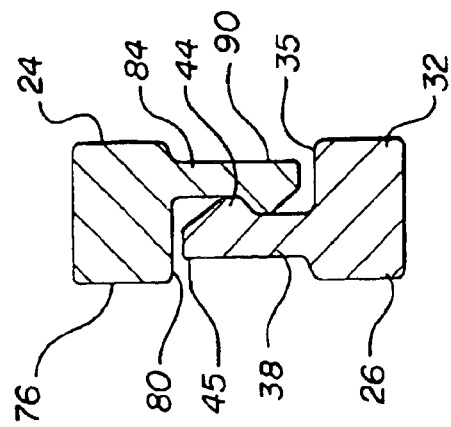
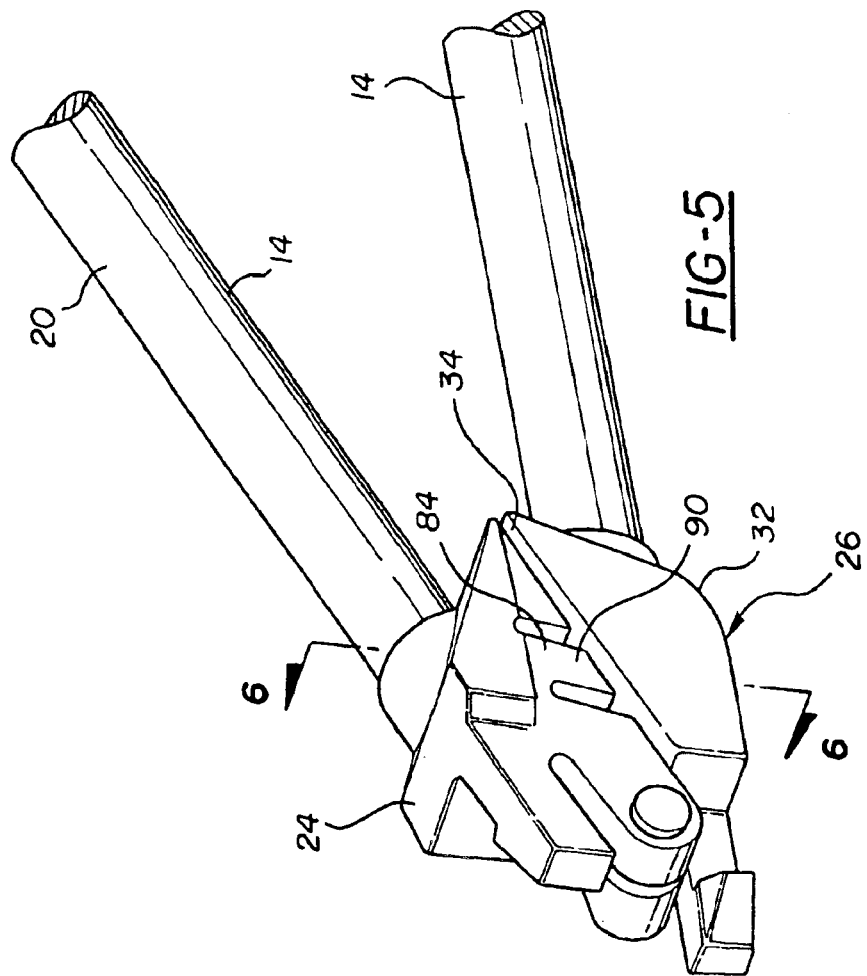

HINGE ASSEMBLY FOR A FOLDING FABRIC TOP

RELATED APPLICATION

This application claims priority to and all the benefits of U.S. Provisional Application No. 60/270,808, filed on Feb. 23, 2001.

FIELD OF THE INVENTION

This invention relates to a hinge assembly for a folding fabric top. More specifically, this invention relates to a hinge assembly for securing a folding fabric top between an open and closed position.

BACKGROUND OF INVENTION

Fabric tops are popular for certain types of vehicles, namely convertible type vehicles. These tops often allow for the partial opening of the top by folding a first section, i.e. the area directly over the front seat passengers, rearwardly to an open position to provide better ventilation and a feeling of openness. When the fabric top is in the open position, it is unsecured and thus able to rattle and move about causing damage to the vehicle and fabric top. Therefore, it is desirable to provide a folding fabric top which may be easily secured in the open position.

SUMMARY OF THE INVENTION

According to one aspect of the invention there is provided a hinge assembly for securing a folding fabric top of an automotive vehicle between an open and closed position. The hinge assembly comprises a front pivot bracket pivotally coupled to a rear pivot bracket for pivotal movement between the closed position wherein the brackets are aligned axially and the open position wherein the brackets are overlapping. A first locking tab extends from each of the front and rear pivot brackets for releasably interlocking and retaining the brackets in the axially aligned closed position. A second locking tab extends from each of the front and rear pivot brackets for releasably interlocking and retaining the brackets in the overlapping open position.

DESCRIPTION OF THE DRAWINGS

In drawings which illustrate embodiments of the present invention,

FIG. 5 is an isometric view of the hinge assembly as attached to the vehicle in the open position; and FIG. 6 is a sectional view of the middle tab of the hinge assembly when in the open position.

DESCRIPTION OF THE INVENTION

Figure 1:
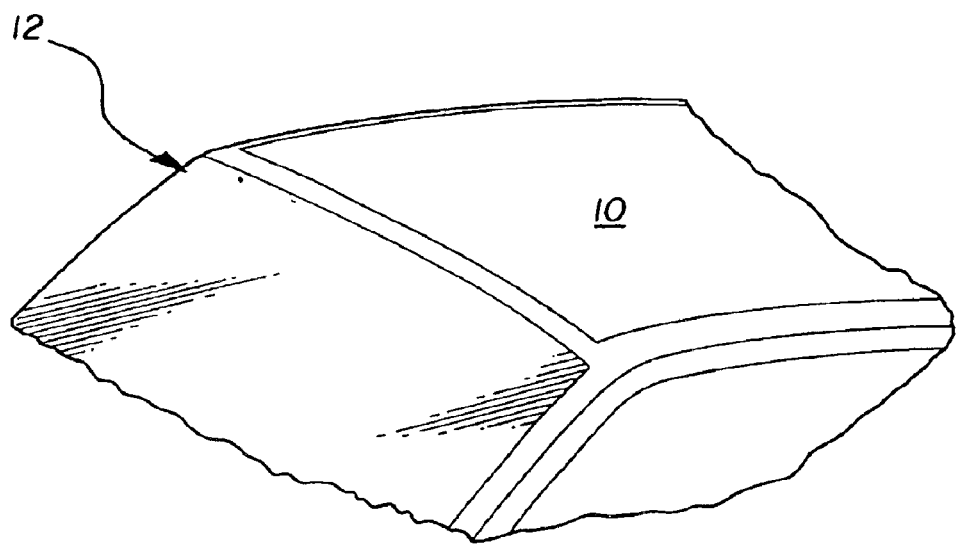
FIG. 1 is an isometric view of the fabric top in the closed position.
Figure 2:
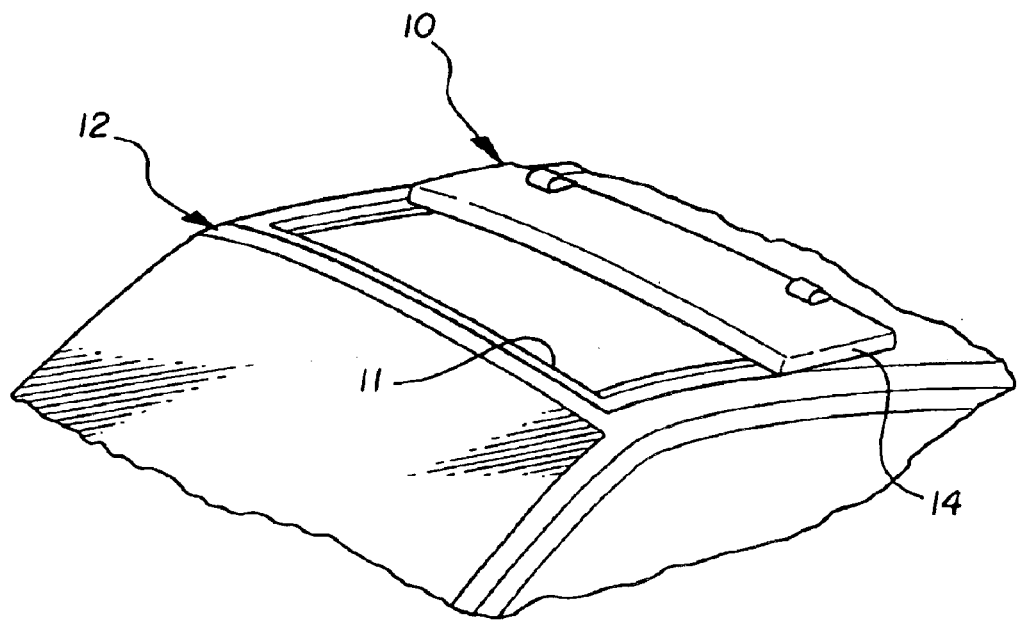
FIG. 2 is an isometric view of the fabric top in the open position.

Referring to FIG. 1, an automotive vehicle 12 is shown with a folding fabric top 10 in a closed position. Referring to FIG. 2, the fabric top 10 is shown in an open position providing access to a sunroof-type opening 11 in the roof panel of the vehicle 12. The fabric top 10 is generally of a material sufficient to be stretched across and supported by a frame structure 14 adapted for mounting the fabric top 10 to the vehicle 12.

Figure 3:
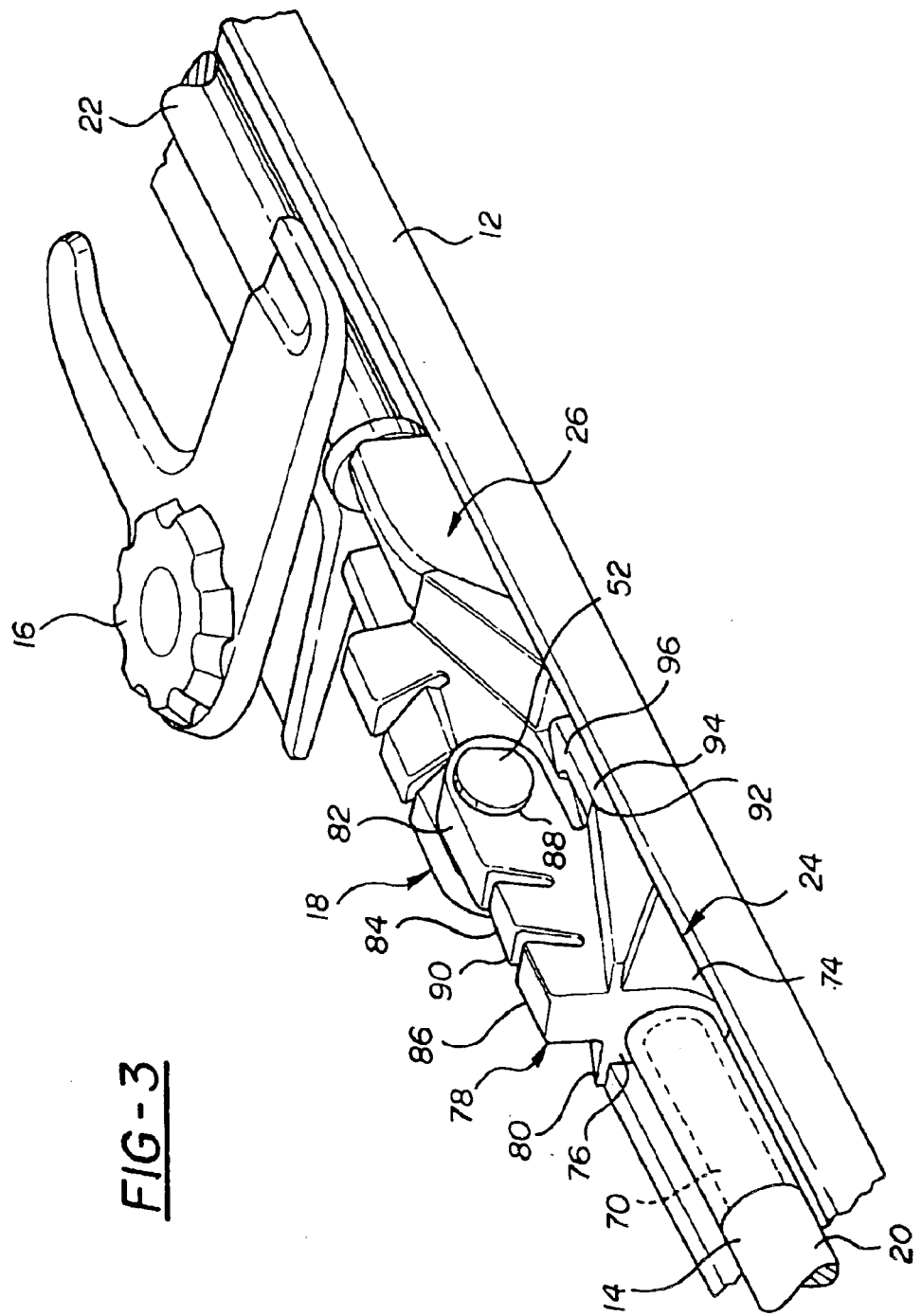
FIG. 3 is an isometric view of the hinge assembly as attached to the vehicle in the closed position.

More specifically, referring to FIG. 3, the frame structure 14 is generally tubular and is removably attached to the vehicle 12 by a latch assembly 16. The frame structure 14 comprises front and rear frame sections 20, 22 which are pivotally interconnected by a hinge assembly 18. The hinge assembly 18 is positioned forward of the latch assembly 16 for rotating the front frame section 20 and a front portion of the fabric top 10 between the open and closed positions while the remaining portion of the fabric top 10 is still attached to the vehicle 12 by the rear frame section 22.

Figure 4:
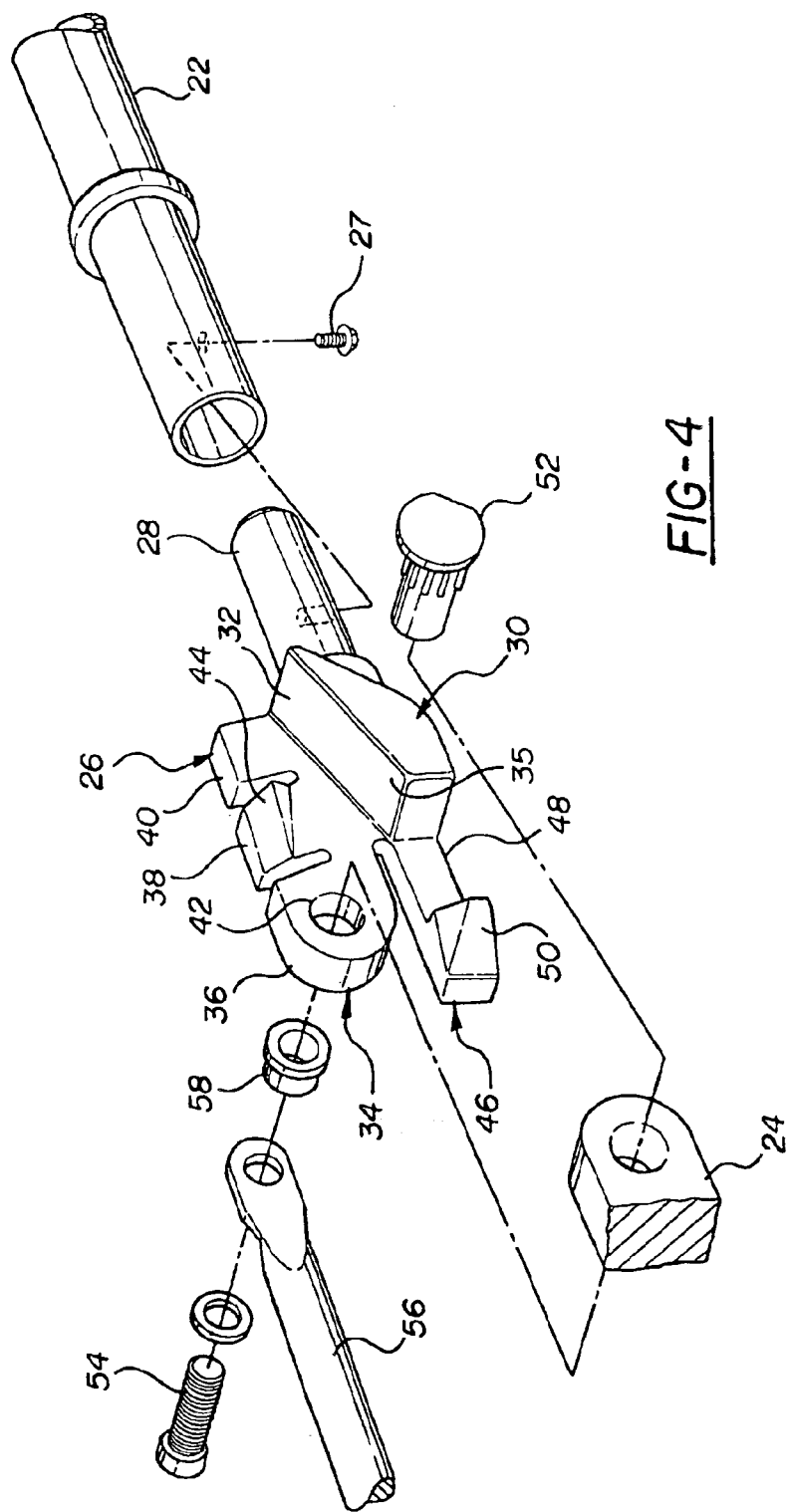
FIG. 4 is a fragmentary isometric exploded view of the hinge assembly.

The hinge assembly 18 comprises front and rear pivot brackets 24, 26 which are symmetrically opposite of each other. Referring to FIG. 4, the rear pivot bracket 26 comprises a cylindrical insert 28 which fits within the rear frame section 22 for securing the rear pivot bracket 26, by way of a mechanical fastener 27, to the rear frame section 22. A body portion 30 extends forwardly from the insert 28.

The body portion 30 comprises a shelf section 32 and a vertical section 34. The shelf section 32 comprises a generally planer upper surface 35 which is shown slightly inclined. The vertical section 34 comprises generally three sections; namely, a front section 36, a middle section 38, and a rear section 40. The front section 36 comprises a throughhole 42 for pivotally interconnecting the front and rear pivot brackets 24, 26.

The middle section 38 comprises a locking tab 44. Referring to FIG. 6, the middle section 38 extends upwardly from the shelf section 32 to a distal end 45. The locking tab 44 tapers downwardly and outwardly from the distal end 45 toward the shelf 32 and arcuately returns to the middle section 38 forming a detent nub portion.

Referring again to FIG. 4, the rear section 40 is generally vertical for supporting the front section 20 of the frame 14 in nonpivotal motion. A locking tab 46 projects forwardly from the body portion 30 and spaced slightly below the front section 36. The locking tab 46 comprises a generally elongated neck 48 projecting longitudinally from the shelf section 32 and a distal head 50 forming a hook portion.

Referring to FIG. 3, the front pivot bracket 24 similarly comprises a cylindrical insert 70 which fits within the front frame section 20 for securing the front pivot bracket 24, by a similar means as that of pivot bracket 26, to the front frame section 20. A body portion 74 extends rearwardly from the insert 70. It should be appreciated that the cross-section of the frame sections and insert may be any desired configuration without varying from the scope of the invention.

The body portion 74 comprises a shelf section 76 and a vertical section 78. The shelf section 76 has a generally planer upper surface 80 and is also slightly inclined for abutting with the rear pivot bracket 26 when in the open position, as shown in FIGS. 5 and 6. Referring to FIG. 3, the vertical section 78 comprises generally three sections; namely, a front section 82, a middle section 84, and a rear section 86. The front section 82 comprises a through-hole 88 for pivotally interconnecting the front and rear pivot brackets 24, 26.

The middle section 84 comprises a locking tab 90, which is of similar design as locking tab 44, and therefore, will not be described in detail here. The locking tab 90 is shaped such that when the middle section 84 intersects with the opposing middle section 38 of the rear pivot bracket 26, the tabs 44, 84 slidably engage and overlappingly interlock, securing the front section 20 of the frame 14 in the open position, as shown in FIGS. 5 and 6.

Referring to FIG. 3, the rear section 86 is generally vertical for supporting the front section 20 of the frame 14 in nonpivotal motion when in the open position. A locking tab 92 projects longitudinally and rearwardly from the body portion 74. The locking tab 92 comprises a generally elongated neck 94 extending from the shelf section 76 and a distal head 96 forming a hook portion in opposite facing alignment with the distal head 45 of the locking tab 46.

Referring to FIGS. 3 and 4, the front and rear pivot brackets 24, 26 are pivotally interconnected by an insert sleeve 52 and bolt 54 passing through the aligned through-holes 42, 88 in the respective brackets 24, 26. A linkage arm 56 is pivotally attached to the insert sleeve 52 by a spacer coupling 58. The linkage 56 extends the length of the front section 20 of the frame 14 and is for urging the fabric top 10 to crease in a specific area when in the open position.

In operation, the front section 20 of the frame 14 and front portion of the fabric top 10 may be rotated about the insert sleeve 52 of the hinge assembly 18 between the closed position, shown in FIG. 1, and the open position, shown in FIG. 2. As shown in FIG. 3, in the closed position, the pivot brackets 24, 26 are retained in axial alignment by the interlocking engagement between the opposing heads 50, 96 of the locking tabs 46, 92. When the front section 20 is pivoted toward the open position, the necks 48, 94 of the locking tabs 46, 92 on the front and rear pivot brackets 24, 26 flex away from each other, allowing for the heads 50, 96 to become disengaged. The front frame section 20 is then pivoted toward the open position. The oppositely facing locking tabs 44, 84 of the middle sections 38, 84 then engage and releasable interlock the detent nub portions, as shown in FIG. 6, to retain the brackets 24, 26, and thus the front section 20 in the open position. Additionally, the upper planar surfaces 35, 80 of the shelf sections 32, 76 contact the facing vertical sections 78, 34, respectively, providing support thereof and preventing further rotation of the front bracket 24 and front section 20.

The above-described embodiment of the invention is intended to be an example of the present invention and alterations and modifications may be effected thereto, by those of skill in the art, without departing from the scope of the invention.

What is claimed is:

1. A hinge assembly for securing a folding fabric top of an automotive vehicle between an open and closed position, said hinge assembly comprising:

a first pivot bracket extending longitudinally between opposing first and second ends defining a first axis pivotally coupled to a second pivot bracket extending longitudinally between opposing first and second ends defining a first axis for pivotal movement between said closed position wherein said brackets are aligned axially and said open position wherein said brackets are overlapping axially between said respective first and second ends;

a first locking tab extending from each of said first and second pivot brackets for releasably interlocking and retaining said brackets in said axially aligned closed position; and a second locking tab extending from each of said first and second pivot brackets for releasably interlocking and retaining said brackets in said overlapping open position.

2. A hinge assembly as set forth in claim 1 wherein said first pivot bracket includes an elongated body portion having a shelf section extending axially between said first and second ends of said second pivot bracket and defined by a planar upper surface and a vertical section extending upwardly from said shelf section.

3. A hinge assembly as set forth in claim 2 wherein said first pivot bracket includes an elongated body portion having a shelf section extending axially between said first and second ends of said second pivot bracket and defined by a planar upper surface and a vertical section extending upwardly from said shelf section.

4. A hinge assembly as set forth in claim 3 wherein each of the vertical sections of said first and second pivot brackets include at least a portion forming said second locking tab extending upwardly from said shelf section to a distal end defining a detent nub portion wherein said second locking tabs interlock in facing overlapping relation with said hinge assembly in said open position.

5. A hinge assembly as set forth in claim 4 wherein said first locking tabs include an elongated neck portion projecting axially from said shelf section of said respective first and second pivot brackets to a distal head wherein said first locking tabs interlock in facing overlapping relationship with said hinge assembly in said closed position.

6. A hinge assembly as set forth in claim 5 wherein said vertical sections include a front section, a middle section forming said second locking tab, and a rear section wherein said middle section is spaced between said front and rear sections.

7. A hinge assembly as set forth in claim 6 wherein said front section of said first pivot bracket includes a through-hole axially aligned with a through-hole in said front section of said second pivot bracket for receiving a insert sleeve there through to pivotally couple said first and second pivot brackets.

8. A hinge assembly as set forth in claim 7 wherein said first pivot bracket includes an insert projecting axially from said body portion opposite said first locking tab for securing said first pivot bracket to a front frame section of the folding fabric top.

9. A hinge assembly as set forth in claim 8 wherein said second pivot bracket includes an insert projecting axially from said body portion opposite said first locking tab for securing said second pivot bracket to a rear frame section of the folding fabric top.

10. A hinge assembly as set forth in claim 9 wherein said upper surfaces of said shelf sections are generally inclined between said first and second ends thereof for engaging and supporting said vertical sections of said opposite pivot bracket in said open position.

* * * * *